S. L. CHARLES.
AUTOMOBILE SLEIGH ATTACHMENT.
APPLICATION FILED FEB. 8, 1909.
939,666.
Patented Nov. 9, 1909.
3 SHEETS—SHEET 1.
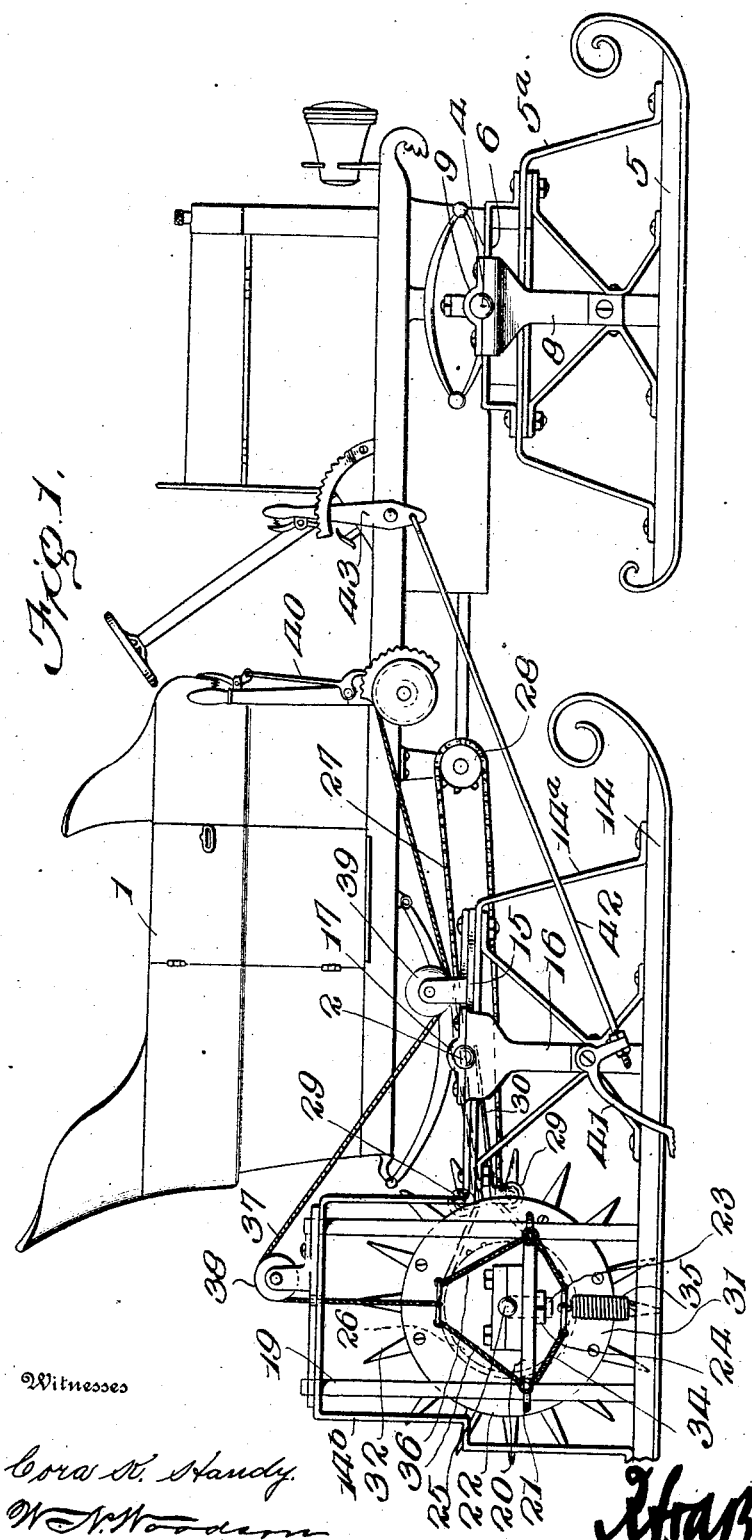

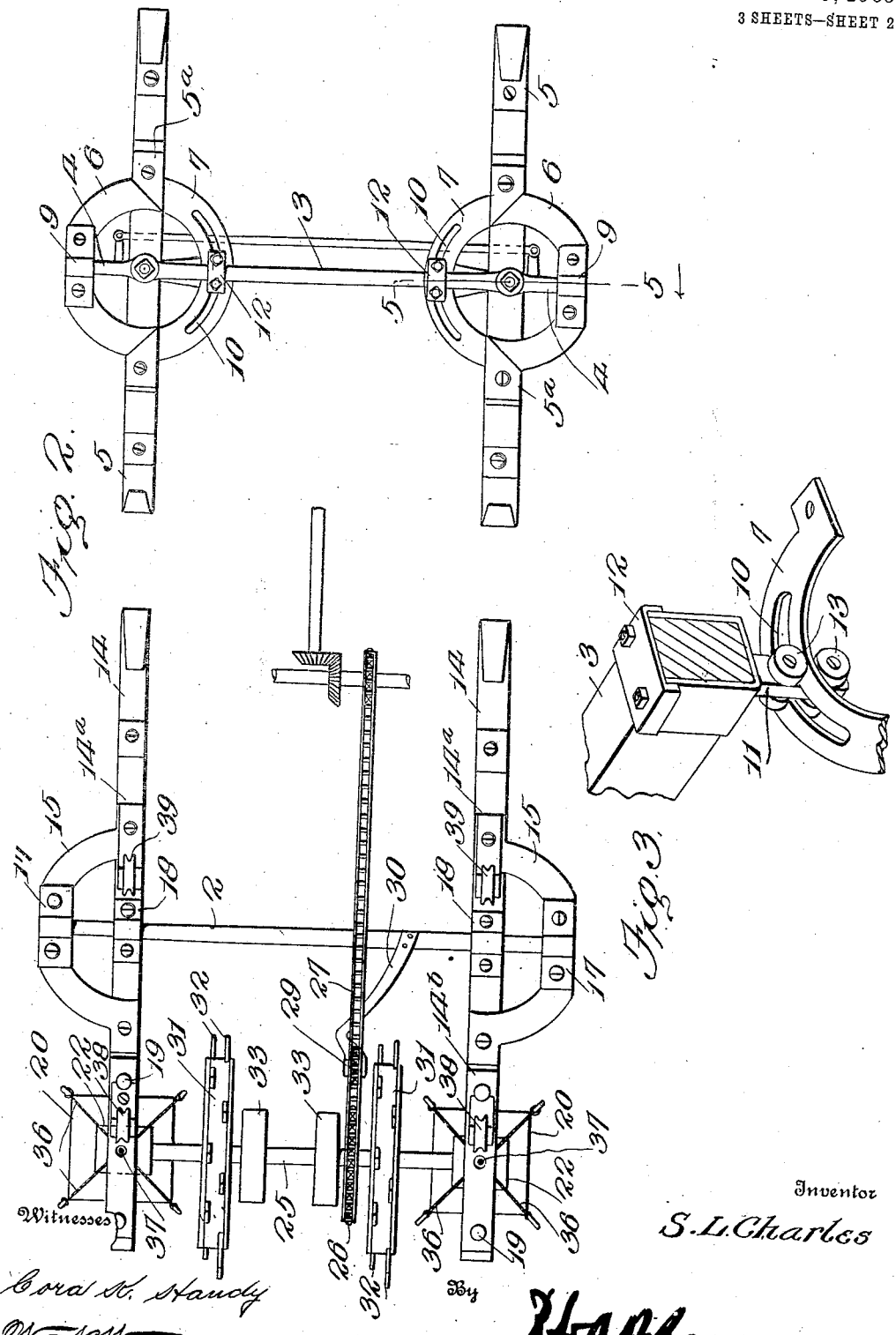

S. L. CHARLES.
AUTOMOBILE SLEIGH ATTACHMENT.
APPLICATION FILED FEB. 8, 1909.
939,666.
Patented Nov. 9, 1909.
3 SHEETS—SHEET 3.
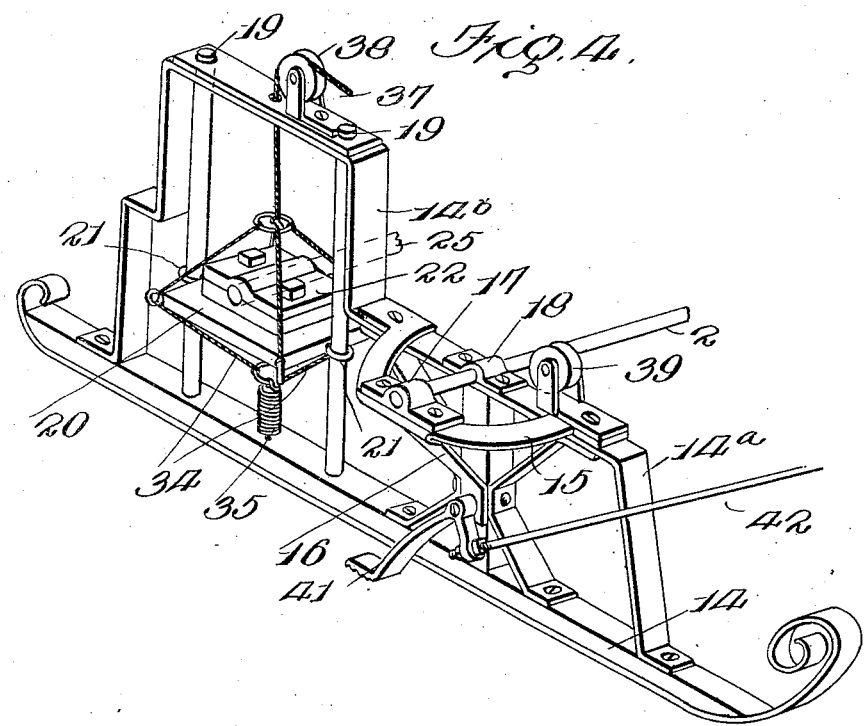
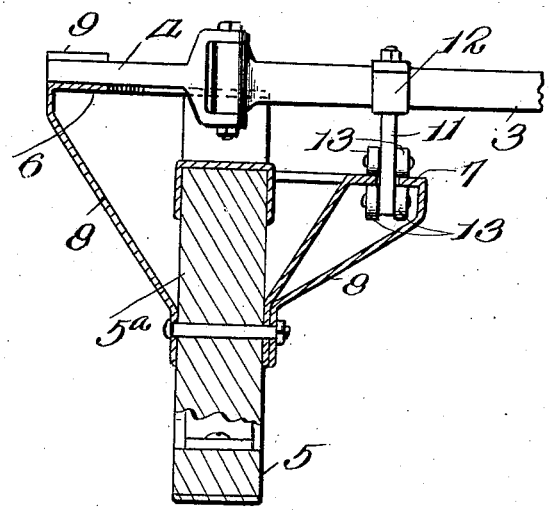
Witnesses
Cora K. Handy.
W. N. Woodson.
Inventor
S. L. Charles
By H. A. Perry, Attorneys

UNITED STATES PATENT OFFICE.

SEWALL L. CHARLES, OF NEILLSVILLE, WISCONSIN.

AUTOMOBILE SLEIGH ATTACHMENT.

939,666.       Specification of Letters Patent.     Patented Nov. 9, 1909.

Application filed February 8, 1909. Serial No. 476,679.

*To all whom it may concern:*

Be it known that I, SEWALL L. CHARLES, a citizen of the United States, residing at Neillsville, in the county of Clark and State of Wisconsin, have invented certain new and useful Improvements in Automobile Sleigh Attachments, of which the following is a specification.

The present invention relates to an improved sleigh attachment which is designed to be applied to an automobile to admit of the same being propelled over ice and snow similar to a sleigh.

The object of the invention is the provision of a simple and inexpensive device of the character which can be readily applied to an automobile or removed therefrom, and which embodies a sleigh propelling wheel mounted to be driven by the engine of the automobile.

For a full understanding of the invention and the merits thereof and also to acquire a knowledge of the details of construction and the means for effecting the result, reference is to be had to the following description and accompanying drawings, in which:

Figure 1 is a side elevation of an automobile having the improved sleigh attachment applied thereto; Fig. 2 is a top plan view of the attachment, the front and rear axles of the automobile being shown; Fig. 3 is a detail view of one of the members engaging the front axle of the automobile; Fig. 4 is a detached perspective view of one of the rear sleigh runners; Fig. 5 is a transverse vertical sectional view through one of the forward sleigh runners on the line 5—5 of Fig. 2.

Corresponding and like parts are referred to in the following description and indicated in all the views of the drawings by the same reference characters.

Referring to the drawings, the numeral 1 designates an automobile from which the wheels have been removed, the rear axle being shown at 2 and the front axle at 3. Pivotally connected to each extremity of the front axle is the usual spindle 4 which is so mounted as to swing about a vertical axis. A sleigh runner 5 is provided for each end of the front axle and these runners are formed with the usual vertical frames 5ᵃ. Projecting outwardly from the upper portion of the vertical frames 5ᵃ of each of the forward sleigh runners is a semi-circular plate 6 and projecting inwardly from the upper portion of each of the said vertical frames is a second semi-circular plate 7, the said plates being disposed in horizontal planes and being connected to the frame by the diagonal braces 8 so as to obtain a rigid construction.

Each of the outwardly projecting semi-circular plates 6 carries a bearing 9 receiving the corresponding spindle 4 of the front axle, while the inwardly projecting semi-circular plates 7 are formed with the segmental slots 10 receiving loosely the arms 11 projecting downwardly from clamps 12 applied to the axle. The pivotal connections between the spindles and the axle are disposed immediately over the frames 5ᵃ of the sleigh runners and the arms 11 are provided with the rollers 13 which bear against the upper and lower faces of the segmental plates 7 and are designed to travel thereon when the runners are turned to change the direction of movement of the sleigh. With this construction the runners have an operative connection both with the spindles 4 and the front axle 3 and are securely braced against any swaying movement, but at the same time can be readily turned through the medium of the spindles to admit of the sleigh being guided by the steering mechanism of the automobile. In a somewhat similar manner a sleigh runner 14 is provided for each end of the rear axle, the said sleigh runners 14 being formed with the vertical frames 14ᵃ. The forward portions of these vertical frames 14ᵃ are provided with outwardly projecting horizontal plates 15 which have a semi-circular formation and are connected to the lower portion of the frames by the diagonal braces 16. Each of these horizontal plates 15 carries a bearing 17 for the reception of the corresponding end of the rear axle, and the frames themselves are provided with the bearings 18 which also engage the rear axle. The rear portions of the vertical frames 14ᵃ are extended upwardly as indicated at 14ᵇ and a pair of vertical guide rods 19 extend from the runner to the top of each extended portion of the frames.

Slidably mounted upon the guide rods 19 of each of the runners is a horizontal block 20 which is also mounted so as to swing slightly about a horizontal axis. As shown on the drawings these blocks have the eyes 21 swiveled upon the opposite ends thereof, the said eyes loosely receiving the guide rods 19. A bearing 22 is applied to each of the horizontal blocks 20 and these bearings are formed with the downwardly extending stems 23 which pass through central openings in the blocks and extend below the blocks where they are threaded and capped by the nuts 24. It will thus be obvious that these bearings are so mounted as to swing either about a horizontal axis or a vertical axis as may be required.

A transverse shaft 25 is journaled in the bearings 22 of the two rear sleigh runners and is provided at its central portion with a sprocket wheel 26 engaging a chain 27 which also passes around a sprocket wheel 28 mounted upon the body portion of the automobile and receiving power from the engine. It is contemplated to provide a tightener for this chain 27, and in the present instance this tightener comprises a pair of wheels 29 carried by the spring arms 30 projecting rearwardly from the automobile, the said wheels engaging both the upper and lower reaches of the chain and being forced toward each other by the spring strips 30 so as to take up any slack in the chain.

Rigid upon the shaft 25 toward each end thereof is a sleigh propelling wheel 31, the said wheels being formed with the radially projecting teeth 32 which are designed to engage the ice or snow and propel the sleigh in the usual manner. Under some circumstances it may also be found desirable to apply a fly wheel 33 to each end of the shaft 25, such an arrangement serving to conserve the energy so as to obtain a uniform movement of the parts and enable the sleigh to pass over any slight obstructions.

The four corners of each of the horizontal blocks 20 are connected by the links 34 to one end of a spring 35 which extends upwardly from the sleigh runner 14 and tends to normally draw the block downwardly so as to hold the sleigh propelling wheels 31 in an operative position. In a somewhat similar manner the four corners of each of the horizontal blocks are also connected by the links 36 to the end of a cable 37 which passes upwardly through the frame 14ª and then over a guide member 38 and forwardly around a second guide member 39, the extremities of the cable being connected by a lever 40 upon the body portion of the automobile. It will thus be obvious that by suitably manipulating these levers 40 the sleigh propelling wheels may either be swung upwardly into an inoperative position, or released so as to be drawn downwardly in an operative position by the action of the springs 35. It is also contemplated to provide a brake for the sleigh, and this brake comprises a pair of curved levers 41 which are pivoted between their ends upon the frames 14ª of the rear sleigh runners. One end of each of these curved brake levers 41 is designed to be swung downwardly so as to project below the runner and engage the ice and snow, while the opposite end is connected by a rod 42 to an operating lever 43 upon the automobile. These brake levers are normally held in an inoperative position, but when it is desired to retard the movement of the sleigh it is merely necessary to manipulate the operating levers 43 and move the brake levers into an operative position.

The blocks 20 are loosely mounted on the guides 19 so as to admit of the proper adjustment of the shaft 25 should any irregularity occur in the lengths of the cables 37 to enable a firm contact of the wheel 31 upon the ice. The provision of the eye-bolts 21 admits of this slight movement.

Having thus described the invention, what is claimed as new is:

1. A sleigh attachment for automobiles, comprising a series of sleigh runners adapted to be applied to the axles of the automobile, vertical guide rods mounted in pairs upon the rear of said sleigh runners, blocks loosely mounted between each pair of the vertical guide rods, a shaft journaled between the blocks, a sleigh propelling wheel upon the shaft, and means for transmitting motion from the engine of the automobile to the shaft.

2. A sleigh attachment for automobiles, comprising a series of sleigh runners adapted to be applied to the axles of the automobile, a vertical guide rod upon each of the sleigh runners of the rear axle, a block movably mounted upon each of the guide rods and adapted to be swung about a horizontal axis, a bearing member mounted upon each of the blocks so as to be turned about a vertical axis, a shaft journaled upon the bearing members, a sleigh propelling wheel applied to the shaft, and means for transmitting motion from the engine of the automobile to the shaft.

3. A sleigh attachment for automobiles, comprising a series of sleigh runners adapted to be applied to the axles of the automobile, bearings mounted upon one pair of the sleigh runners so as to turn about either a vertical axis or a horizontal axis, a shaft journaled upon the bearings, a sleigh propelling wheel applied to the shaft, and means for transmitting motion from the engine of the automobile to the shaft.

4. A sleigh attachment for automobiles, comprising a series of sleigh runners adapted to be applied to the axles of the automobile, bearings movably mounted upon one pair of the sleigh runners, a shaft journaled upon the bearings, a sleigh propelling wheel applied to the shaft, springs normally tending to move the bearings downwardly to hold the sleigh propelling wheel in an operative position, means for raising the bearings against the action of the springs to lift the sleigh propelling wheel into an inoperative position, and means for transmitting motion from the engine of the automobile to the shaft.

5. A sleigh attachment for automobiles, comprising a series of sleigh runners adapted to be applied to the axles of the automobile, vertical guide rods upon one pair of the sleigh runners, blocks slidably mounted upon these guide rods, bearings upon these blocks, a shaft journaled upon the bearings, a sleigh propelling wheel applied to the shaft, springs acting upon the blocks to draw them downwardly and normally hold the sleigh propelling wheel in an operative position, means for moving the blocks upwardly to throw the sleigh propelling wheel into an inoperative position, and means for transmitting motion from the engine of the automobile to the shaft.

6. A sleigh attachment for automobiles, comprising a series of sleigh runners adapted to be applied to the axles of the automobile, those sleigh runners applied to the front axle being rigid with the spindles and having an operative connection with the body portion of the axle.

7. The combination with the front axle of an automobile having spindles pivotally connected to the ends thereof so as to swing about a vertical axis, of sleigh runners, vertical frames upon the sleigh runners, horizontal plates projecting outwardly from these vertical frames and provided with means for engaging the spindles, a second set of horizontal plates projecting inwardly from the frames, and members applied to the front axle and having a sliding connection with the second set of horizontal plates.

8. The combination with the front axle of an automobile having spindles pivoted to the ends thereof so as to swing about a vertical axis, sleigh runners, vertical frames upon the sleigh runners, horizontal plates projecting outwardly from the vertical frames and provided with means for engaging the spindles, a second set of horizontal plates projecting inwardly from the vertical frames and formed with segmental slots, and arms projecting from the axles and loosely received within these slots.

9. The combination with the front axle of an automobile having the spindles pivotally connected thereto so as to swing about a vertical axis, of sleigh runners, vertical frames upon the sleigh runners, horizontal plates projecting outwardly from the vertical frames, bearings upon the said horizontal plates for engaging the spindles, a second set of horizontal plates projecting inwardly from the frames and formed with segmental slots, arms projecting from the axle and passing loosely through the segmental slots, and rollers carried by the arms, the said rollers engaging the upper and lower faces of the horizontal plates and being designed to travel thereon.

10. In a device as specified the combination with an automobile of runners disposed upon the forward pivoted spindles of the same, runners carried on the opposite extremities of the rear axle of said automobile, a shaft transversely positioned between said rear runners, bearings adjustably mounted on said rear runners for supporting said shaft, a toothed wheel loosely mounted on said shaft, a sprocket carried on said shaft, a chain mounted over said sprocket and connected to the engine of said automobile to propel said shaft, springs carried by said rear runners and connected to said bearings for normally holding the same in a downward position and means connected to said automobile for raising said bearings at times to raise said toothed wheel out of engagement with the ice.

In testimony whereof I affix my signature in presence of two witnesses.

SEWALL L. CHARLES. [L. S.]

Witnesses:
I. F. SCHUSTER,
CHAS. F. GROW.